Feb. 10, 1970  R. J. FOWLER  3,494,493
SPARE TIRE CARRYING DEVICE
Filed Jan. 2, 1968  2 Sheets-Sheet 1
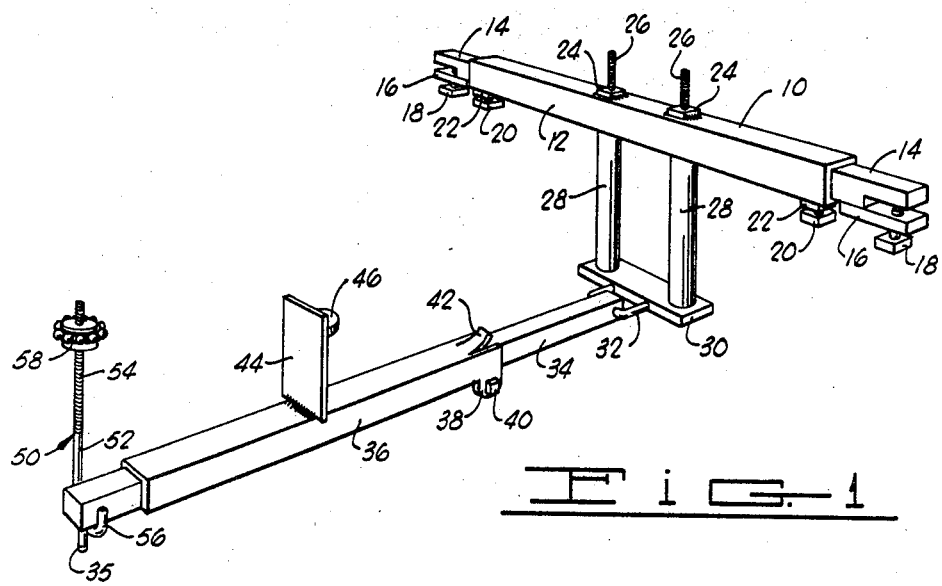
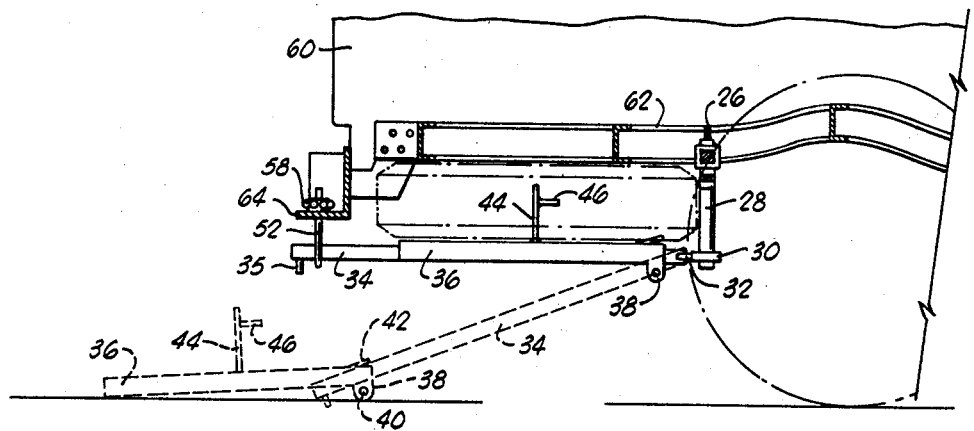
INVENTOR.
Roy J. Fowler
BY
Dunlap and Laney
ATTORNEY

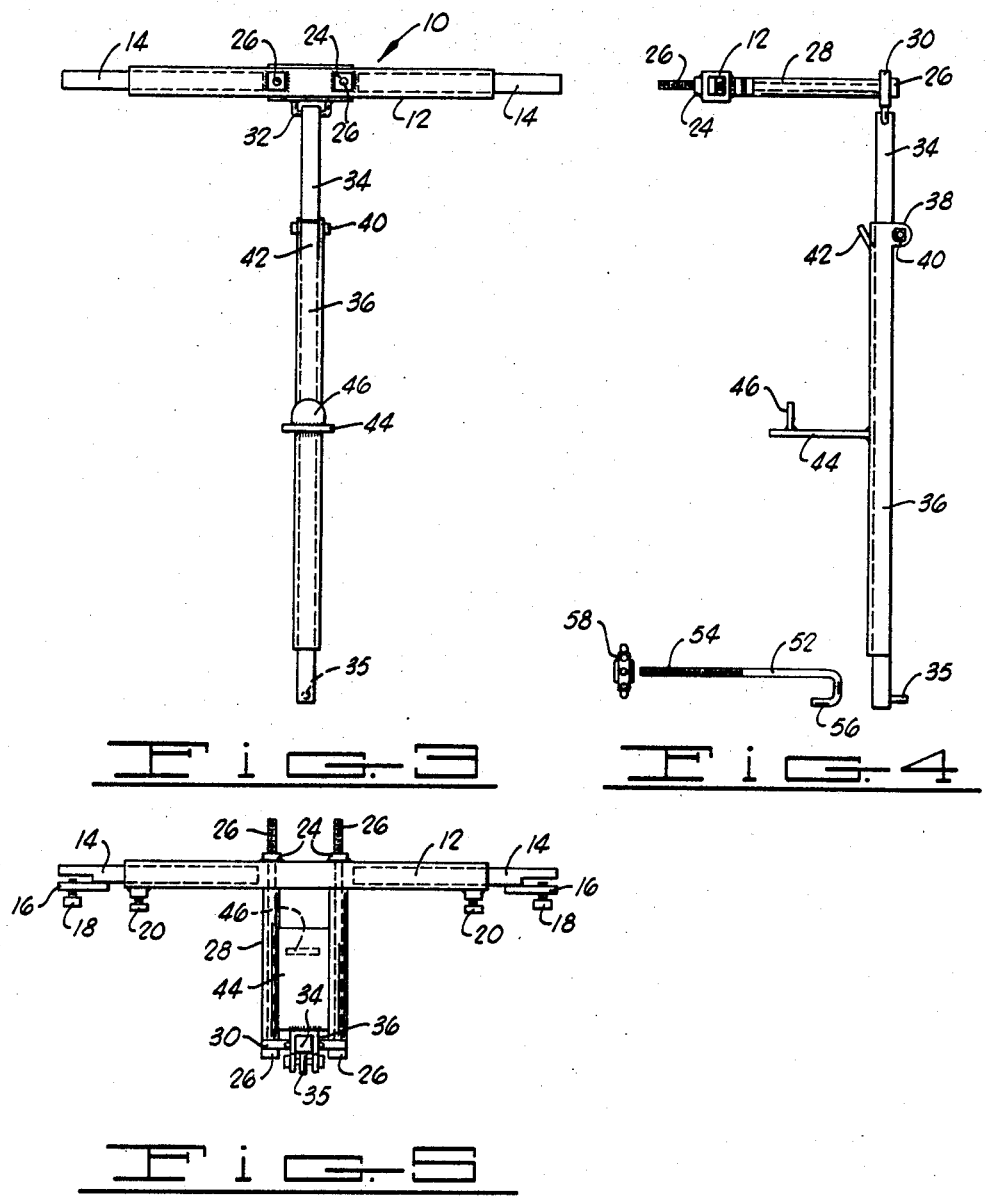

United States Patent Office 3,494,493
Patented Feb. 10, 1970

3,494,493
SPARE TIRE CARRYING DEVICE
Roy J. Fowler, Rte. 2, Elk City, Okla. 73644
Filed Jan. 2, 1968, Ser. No. 694,978
Int. Cl. B62d *43/04*
U.S. Cl. 214—454                    10 Claims

ABSTRACT OF THE DISCLOSURE

A spare tire carrier which includes a horizontally extending, adjustable length bar assembly adapted to attach the device to varying width vehicle frames, and supporting from the central portion thereof, one end of an elongated wheel support bar which has slidably mounted thereon for longitudinal movement therealong, a tire carrier element upon which the spare tire is retained during storage. The opposite end of the wheel support bar is detachably connected to the rear bumper or other rear portion of a truck or similar vehicle by means of a J-bolt.

BACKGROUND OF THE INVENTION

Field of the invention

This invention relates to spare tire carrying devices, and more particularly, to quick change spare tire carrying devices by means of which a spare tire can be mounted beneath the frame or chassis of pickup trucks and similar vehicles.

Brief description of the prior art

Devices have heretofore been proposed for mounting a spare tire in an unobstructive, fairly accessible location beneath the rear portion of the frame or chassis of vehicles such as pickup trucks or the like. Devices of this type have frequently been fairly simple in construction and easily used, but have lacked sufficient universality to permit them to be installed on trucks having varying frame sizes. This presents difficulties in stocking a full line of devices which will satisfy all customers, and frequently disappoints and disillusions customers who purchase devices of this type.

Another problem which is characteristic of some of these devices as they have been previously manufactured is that the vehicle operator must get down and crawl under the rear end of the truck in order to release or detach the spare tire from the tire carrying device and make it ready for utilization on the vehicle. In some instances, after the truck operator has scooted under the rear end of the vehicle on his back, finally gotten the tire carrier unfastened and the tire pulled from beneath the vehicle, the carrier for the tire simply has to be wired up to the truck frame, or else completely removed until such time as the flat tire has been fixed, and the spare tire put back on the carrier rack. Then, of course, it is again necessary for the operator to fasten the carrier into place lying on his back and under the truck.

Brief description of the present invention

The present invention provides a spare tire carrying device which can be quickly secured in place to the frame of substantially any automotive, truck-type vehicle without difficulty, and when once secured in place on the frame, can be utilized to permit easy access to, and out-of-the-way storage of, a spare tire. Access to the spare is easily gained by the vehicle operator without any necessity to move any portion of his body beneath the truck. Rather, the operator need only stand or stoop at the rear end of the truck and pull a movable portion of the carrier device rearwardly to bring the spare tire within easy reach.

Broadly described, the present invention comprises an elongated, adjustable attachment bar means which is adjustable to varying lengths, and which includes frame attachment means at the opposite ends thereof facilitating securement of the attachment bar means to the opposite sides of the frame of the vehicle. The device further includes an elongated, horizontally extending wheel support bar which is pivotally suspended by one of its ends beneath the attachment bar means, and which is detachably suspended by its other end to the rear portion of the vehicle on which the device is used, preferably being suspended from the rear bumper by means of a J-bar or other suitable securing means. The elongated wheel support bar carries slidingly theron, a tire carrier element which can slide longitudinally along the wheel support bar, and which is constructed to detachably engage, for movement therewith, a tire which rests upon, or is supported by, the upper surface of the tire carrier element. The tire carrier element is connected to the wheel support bar for limited upward pivotal movement about a horizontal pivotal axis when the tire carrying device is mounted on a vehicle with the elongated, adjustable attachment bar means extending transversely across the vehicle with its opposite ends secured to the frame of the vehicle.

An important object of the present invention is to provide a spare tire carrying device by means of which a spare tire can be stored in a secure, yet out-of-the-way location beneath the rear end portion of a truck chassis or frame.

A further object of the invention is to provide a spare tire carrying device which includes certain movable parts which facilitate retrieval of the spare tire from its storage position beneath the chassis or frame of a truck vehicle without the necessity for the operator to crawl beneath the vehicle.

Another object of the present invention is to provide a spare tire carrying device which is adjustable so as to permit it to be connected to vehicle frames of varying transverse dimensions.

Yet another object of the present invention is to provide a spare tire carrying device which is fairly simple in construction, and therefore may be relatively economically fabricated, yet is characteried in having substantial structural strength and a long and trouble-free operating life.

In addition to the foregoing described objects and advantages of the invention, additional objects and advantages will become apparent as the following detailed description of the invention is read in conjunction with the accompanying drawings which illustrate the invention.

BRIEF DESCRIPTION OF THE DRAWINGS

FIGURE 1 is a perspective view of the spare tire carrying device of the present invention.

FIGURE 2 is a side elevational view of the spare tire carrying device of the invention as it appears when mounted in operating position for carrying a spare tire on a truck vehicle.

FIGURE 3 is a plan view of the spare tire carrying device of the invention with the supporting means for detachably supporting one end of the wheel support bar from the rear end of the truck removed from this view for clarity of illustration.

FIGURE 4 is an enlarged side elevation view of the spare tire carrying device of the invention with certain parts shown detached or disconnected from each other for clarity of illustration.

FIGURE 5 is an end view of the spare tire carrying device of the invention with the means for supporting one end of the wheel support bar from the rear end of a vehicle being omitted for clarity of illustration.

DESCRIPTION OF A PREFERRED EMBODIMENT OF THE INVENTION

Referring initially to FIGURE 1 of the drawings, the spare tire carrying device of the invention includes an elongated, adjustable, horizontally extending attachment bar means, designated generally by reference numeral 10. The attachment bar means 10 includes an elongated, open-ended, tubular upper carrier bracket 12 into which project a pair of aligned, horizontally extending attachment bars 14. At its outer end, each attachment bar 14 is relieved or notched and an overlapping, flat, lip brace 16 is welded or otherwise suitably secured to the lower portion of the respective attachment bar. Each of the lip braces 16 forms with the relieved upper end portion of each bar, a rigid C-shaped flange-engaging portion which opens outwardly, and is dimensioned to receive the flange of an I- or C-shaped frame member of an automobile frame. Each of the lip braces 16 is threaded to receive a set screw 18 which constitutes a suitable securing element for securing a frame flange projected into the C-shaped flange engaging portion at the end of each of the attachment bars. In this manner, the spare tire carrying device is attached to the vehicle frame as more fully hereinafter described.

Each of the attachment bars 14 is slidingly movable in the tubular upper carrier bracket 12 so that the overall length of the elongated, adjustable attachment bar means 10 can be varied to adapt the tire carrier device to use upon vehicles having differing frame widths. When the attachment bars 14 are slidably adjusted to the desired positions for engaging the opposed frame members, set screws 20 threaded through suitable nuts 22 secured to the underside of the tubular upper carrier bracket 12 are threaded upwardly to engage the attachment bars and lock them in their proper positions.

At a medial or central portion of the tubular upper carrier bracket 12, and between the opposed inner ends of the attachment bars 14, a pair of nuts 24 are welded to the top side of the tubular upper carrier bracket and receive the threaded ends of a pair of elongated bolts 26. The lower ends of these bolts disposed on the opposite side of the upper carrier bracket 12 are preferably encased in lengths of resilient tubular elements 28 to protect the bolts from wear and corrosion, and to reduce noise. The lower ends of the bolts 26 are passed through a lower carrier bracket 30 and function to secure the lower carrier bracket at a selected distance below the tubular upper carrier bracket 12.

The lower carrier bracket 30 has secured to a central portion of one longitudinal edge thereof, the free ends of the legs of a U-shaped rod 32. The U-shaped rod 32 has its bight extended through an aperture formed in one end of an elongated wheel support bar 34 so that the wheel support bar can pivot about a horizontal axis. At its opposite end, the support bar 34 has secured thereto a downwardly depending stop pin 35.

A channel-shaped sliding tire carrier 36 having a C-shaped cross-section is supported on the wheel support bar 34 for longitudinal sliding movement therealong. The sliding tire carrier 36 has a pair of downwardly depending ears 38 formed at one end thereof and positioned on opposite sides of the wheel support bar 34. A securing bolt 40 is passed through the ears of the sliding tire carrier and beneath the wheel support bar 34 to secure the tire carrier to the support bar. At the end of the sliding tire carrier 36 which carries the ears 38, and formed in the web portion of the sliding tire carrier is an upwardly bent, movement limiting tongue 42 which has been cut out of the plane of the web of the tire carrier and bent upwardly as shown in FIGURE 1. Intermediate the length of the sliding tire carrier 36, and secured to the upper surface or web portion thereof, is a tire retaining flange 44 which extends upwardly in a vertical plane, and has a holding lip 46 secured to the side thereof which faces the horizontally extending attachment bar means 10.

As a final portion of the spare tire carrying device of the invention, means in provided for supporting the opposite end of the wheel support bar 34 from its end secured to the U-rod 32. This supporting means is designated generally by reference numeral 50 and includes a J-bar 52 having threads 54 at the upper end thereof and a U-shaped hook portion 56 at the lower end thereof. A hand nut 58 is threaded on the upper end of the J-bar 52 and is used for a purpose hereinafter described.

OPERATION OF THE DEVICE

In utilizing the spare tire carrying device of the invention, the elongated, adjustable, horizontally extending attachment bar means 10 is first adjusted in its overall length by sliding the attachment bars 14 inwardly or outwardly in the tubular upper carrier bracket 12 until the desired length is reached which will permit the C-shaped end portions of each of the attachment bars to be secured to flanges of the opposed side portions of the vehicle frame. The point of attachment to the frame will usually be just to the rear of the rear axle of the vehicle, with such positioning of the spare tire carrying device relative to a truck vehicle 60 being shown in FIGURE 2. The attachment bars 14 are each securely attached to the opposite sides of the frame 62 by threadedly moving the set screws 18 upwardly in the lip braces 16 until firm frictional engagement with the flanges of the frame is attained. It will be noted from the foregoing description of the manner in which the length of the attachment bar means 10 is adjusted that the tire carrying device of the invention can be utilized on vehicles of varying frame width.

Depending on the structure of the vehicle to which the device is attached, and the size of the tire which is to be carried, it may occasionally also be desirable to adjust the vertical distance which separates the wheel support bar 34 and the sliding tire carrier 36 from the horizontally extending attachment bar means 10. This may be accomplished by threading the bolts 26 upwardly or downwardly in the nuts 24 so as to adjust the vertical position of the lower carrier bracket 30 with respect to the tubular upper carrier bracket 12. When this adjustment has been made in the manner desired, the wheel support bar 34 may be pivoted downwardly and the sliding tire carrier 36 can be moved rearwardly on this bar by sliding until the status illustrated in dashed lines in FIGURE 2 has been attained. It will be noted that the rearwardly sliding movement of the sliding tire carrier 36 on the wheel support bar 34 is limited by the stop pin 35, and that the sliding tire carrier can be pivoted upwardly to a limited extent as permitted by the movement limiting tongue 42. Thus, when the wheel support bar 34 and sliding tire carrier 36 have reached the position shown in FIGURE 2 in dashed lines, a spare tire may be positioned so that the tire rests in a substantially horizontal position on the upper or web portion of the sliding tire carrier 36 with the retaining flange 44 and holding lip 46 projecting into or through the opening in the central portion of the tire.

The tire and the sliding tire carrier 36 upon which it rests may then be pushed forward, with the tire carrier sliding longitudinally along the wheel support bar 34. When the tire and tire carrier 36 have been pushed inwardly a sufficient distance, corresponding to the position shown in full lines in FIGURE 2, the wheel support bar 34 is pivoted upwardly about the bight portion of the U-shaped rod 32. In order to support the wheel support bar 34 in a substantially horizontally extending position, the J-bar 52 is extended upwardly through a horizontal flange portion or the rear bumper 64 of the truck 60 with the hook portion 56 of the J-bar passed under and around the wheel support bar 34 as shown in FIGURE 2. If the proper adjustment has been made by use of the bolts 26 to bring the wheel support bar 34 to the proper horizontal position, the hand nut 58 can then be threaded downwardly on the threads 54 at the upper end of the J-bar 52 to draw the J-bar and the rear end of the wheel support bar 34 upwardly until the upper side of the tire is pressed against the bed of the truck, or whatever substructure may be exposed above the tire. By placing the tire slightly in compression by threading the hand nut far enough onto the upper end of the J-bar, the tire is securely held in position during operation of the vehicle upon which it is carried. The J-bar 52 cannot shift any substantial distance along the wheel support bar 34, and is prevented from passing over the free rear end of this bar by the stop pin 35.

At such time as the vehicle may develop a flat, and it becomes necessary to use the spare tire to replace the damaged tire, the procedure for mounting the spare tire beneath the vehicle is simply carried out in reverse order to obtain or retrieve the spare tire from its storage position. Thus, the hand nut 58 is simply threaded upwardly on the upper end of the J-bar 52 until the rear end portion of the wheel support bar 34 can be released. When the wheel support bar 34 falls downwardly or is lowered, a sufficient inclination of this bar exists to permit the sliding tire carrier 36 and the relatively heavy tire carried thereon to slide to the rear portion of the wheel support bar, and, in many cases, to continue on under its momentum to the position illustrated in dashed lines in FIGURE 2. When the sliding tire carrier 36 has attained this position either under its own momentum, or by being easily pulled outwardly by the vehicle operator, the spare tire can be lifted from the vertically extending tire retaining flange 44 and holding lip 46 and exchanged for the punctured tire on one of the wheels of the vehicle.

From the foregoing description of the invention, it is believed that it will have become apparent that the present invention provides a very versatile, easily used spare tire carrying device which can be adapted to utilization on vehicles having frames of varying sizes. The device can be manufactured very economically, yet is mechanically rugged in construction, and is characterized in having a long and trouble-free operating life. The frustration of the vehicle operator in retrieving spare tires carried beneath the frame of truck vehicles in the manner heretofore employed is obviated, and ready access can be had at all times to the spare tire, yet there is no danger or fear of at any time losing the spare tire from its position of storage.

Although a preferred embodiment of the invention has been herein described in order to provide an example which can be followed by those skilled in the art in practicing the invention, it is to be understood that various innovations and changes can be made in the described structure without departure from the basic principles which underlie the invention. All changes and innovations of this type which continue to rely on such basic princlipes are therefore deemed to be circumscribed by the spirit and scope of the invention except as the same may be necessarily limited by the appended claims or reasonable equivalents thereof.

What is claimed is:

1. A spare tire carrying device comprising:
   elongated, horizontally extending, adjustable length attachment bar means comprising:
      an elongated, open-end tubular upper carrier bracket;
      a pair of aligned, horizontally extending attachment bars each having a portion extending into one of the open ends of said tubular upper carrier bracket, and slidable toward and away from each other in said tubular upper carrier bracket;
      retaining means for retaining each of said attachment bars in a preselected position relative to each other and to said tubular upper carrier bracket whereby the length of said attachment bar means can be selectively varied;
      rigid C-shaped flange engaging portions at the end of each of said attachment bars; and
      securing elements carried by said flange engaging portions for securing the flanges of an automobile frame in said flange engaging portions;
   a lower carrier bracket;
   means connecting said lower carrier bracket to a central portion of said attachment bar means and adjustably spacing said carrier bracket below said attachment bar means;
   an elongated, two-ended wheel support bar pivotally connected at one of its ends to said carrier bracket for pivotation about a horizontal axis;
   supporting means for detachably supporting the second end of said support bar from the rear end of a vehicle; and
   a tire carrier element slidably mounted on said wheel support bar for sliding movement therealong in a longitudinal direction and including tire retaining means for retaining a tire on said carrier element during said sliding movement, said tire carrier element being connected to said wheel support bar for limited upward pivotal movement about a horizontal pivotal axis located on the end of said carrier element nearest said carrier bracket.

2. A spare tire carrying device as defined in claim 1 wherein said connecting means comprises a pair of spaced bolts threadedly connected between said upper carrier bracket and said lower carrier bracket.

3. A spare tire carrying device as defined in claim 2 and further characterized to include resilient, protective tubular elements positioned around the portions of said bolts between said upper and lower carrier brackets.

4. A spare tire carrying device as defined in claim 2 wherein said lower carrier bracket comprises
   a plate extending between said bolts; and said device is further characterized to include
   a U-shaped rod having its legs secured to said plate between said bolts and having its web portion passed through one end of said support bar and pivotally securing said support bar to said plate.

5. A spare tire carrying device as defined in claim 1 wherein said supporting means comprises
   a J-bar having a hook-shaped portion at one end thereof; and
   a hand nut threaded on the opposite end of the J-bar.

6. A spare tire carrying device as defined in claim 1 wherein said tire carrier element is an elongated, C-shaped channel member positioned to slidably receive said support bar, and including
   a movement limiting tongue bent upwardly out of the web portion thereof at the end of said channel member nearest said lower carrier bracket;
   a pair of ears extending downwardly from said channel member on opposite sides of said support bar at the end of said channel member carrying said movement limiting tongue; and
   securing means extending between said ears and beneath said support bar.

7. A spare tire carrying device as defined in claim 6 wherein said supporting means comprises
   a J-bar having a hook-shaped portion at one end thereof; and
   a hand nut threaded on the opposite end of said J-bar.

8. A spare tire carrying device comprising:
   elongated, adjustable, horizontally extending attachment bar means of variable length and including:
      an elongated, upper carrier bracket;
      a pair of aligned, horizontally extending attachment bars each having a portion slidably engaging said upper carrier bracket, and slidable toward and away from each other on said upper carrier bracket whereby the length of said attachment bar means can be varied;

flange engaging portions secured to the end of each of said attachment bars; and securing elements carried by said flange engaging portions for securing the flanges of an automobile frame to said flange engaging portions;

a lower carrier bracket;

means connecting said lower carrier bracket to said upper carrier bracket and spacing said lower bracket below said upper carrier bracket;

an elongated, two-ended wheel support bar pivotally connected at one of its ends to said lower carrier bracket for pivotation about a horizontal axis;

supporting means for detachably supporting the second end of said support bar from the rear end of a vehicle; and a tire carrier element slidably mounted on said wheel support bar for sliding movement therealong in a longitudinal direction and including tire retaining means for retaining a tire on said carrier element during said sliding movement, said tire carrier element being connected to said wheel support bar for limited upward pivotal movement about a horizontal pivotal axis located on the end of said carrier element nearest said lower carrier bracket.

9. A spare tire carrying device as defined in claim 8 wherein said flange engaging portions secured to the end of each of said attachment bars is a C-shaped member.

10. A spare tire carrying device as defined in claim 8 and further characterized as including retaining means for retaining each of said attachment bars in a preselected position relative to each other and to said upper carrier bracket.

References Cited

UNITED STATES PATENTS

| | | | |
|---|---|---|---|
| 1,761,916 | 6/1930 | Hebner | 214—454 |
| 2,645,394 | 7/1953 | De Bord | 214—454 |
| 3,223,263 | 12/1965 | Fielding | 214—454 |

HUGO O. SCHULZ, Primary Examiner